(12) United States Patent
Ehlig et al.

(10) Patent No.: US 10,859,009 B2
(45) Date of Patent: Dec. 8, 2020

(54) INTEGRATED NATURAL GAS FLOW REGULATION SYSTEM INCLUDING FUEL TEMPERATURE HOMOGENIZATION FOR IMPROVED ENGINE PERFORMANCE AND REDUCED EMISSIONS

(71) Applicant: Parker-Hannifin Corporation, Cleveland, OH (US)

(72) Inventors: William Ehlig, San Francisco, CA (US); Anil Raina, Berkeley, CA (US); Madhukar Puniani, Berkeley, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 172 days.

(21) Appl. No.: 15/567,379

(22) PCT Filed: Apr. 20, 2016

(86) PCT No.: PCT/US2016/028392
§ 371 (c)(1),
(2) Date: Oct. 18, 2017

(87) PCT Pub. No.: WO2016/172177
PCT Pub. Date: Oct. 27, 2016

(65) Prior Publication Data
US 2018/0135538 A1    May 17, 2018

Related U.S. Application Data

(60) Provisional application No. 62/149,889, filed on Apr. 20, 2015.

(51) Int. Cl.
*F02D 19/02*    (2006.01)
*F02M 21/02*    (2006.01)
(Continued)

(52) U.S. Cl.
CPC ......... *F02D 19/023* (2013.01); *F02D 19/022* (2013.01); *F02M 21/0215* (2013.01);
(Continued)

(58) Field of Classification Search
CPC ... F02D 19/023; F02D 19/022; F02M 31/183; F02M 31/02; F02M 21/0227; F02M 21/0215; F02M 21/0239; G05D 16/10
See application file for complete search history.

(56) References Cited

U.S. PATENT DOCUMENTS

| 5,443,083 A | 8/1995 | Gotthelf |
| 5,450,832 A | 9/1995 | Graf .............................. 123/515 |

(Continued)

FOREIGN PATENT DOCUMENTS

| CN | 103261648 A | 12/2010 |
| CN | 104279085 A | 7/2014 |

(Continued)

OTHER PUBLICATIONS

International Search Report and Written Opinion for corresponding International Application No. PCT/US2016/028392 dated Oct. 6, 2016.

(Continued)

*Primary Examiner* — Larry L Furdge
(74) *Attorney, Agent, or Firm* — Renner, Otto, Boisselle & Sklar, LLP

(57) ABSTRACT

A fluid pressure regulation and conditioning module comprises a metal manifold including a fluid flow path between fluid inlet outlets, a pressure regulator assembled to the metal manifold and disposed along the fluid flow path for regulating the pressure of the fluid exiting the module, and a filter assembly. The metal manifold further includes, for heating of the metal manifold with an externally supplied heat exchange media, a heat exchange media flow path (Continued)

extending between heat exchange media inlet and outlet. The filter assembly includes a metal filter housing and a filter element contained within the metal filter housing, the metal filter housing being in direct thermal contact with the metal manifold whereby heat from the metal manifold can flow to the metal filter housing for heating of the fluid not only in the metal manifold but also within the metal filter housing.

20 Claims, 3 Drawing Sheets

(51) Int. Cl.
  *G05D 16/10* (2006.01)
  *F02M 31/02* (2019.01)
  *F02M 31/18* (2006.01)
(52) U.S. Cl.
  CPC .... *F02M 21/0227* (2013.01); *F02M 21/0239* (2013.01); *F02M 31/02* (2013.01); *F02M 31/183* (2013.01); *G05D 16/10* (2013.01); *Y02T 10/12* (2013.01); *Y02T 10/30* (2013.01)

(56) References Cited

U.S. PATENT DOCUMENTS

| | | | | |
|---|---|---|---|---|
| 5,483,943 | A * | 1/1996 | Peters | F02M 21/0239 123/527 |
| 5,890,512 | A * | 4/1999 | Gotthelf | G05D 16/0663 137/484.6 |
| 5,964,206 | A | 10/1999 | White et al. | |
| 6,041,762 | A | 3/2000 | Sirosh et al. | |
| 9,186,602 | B2 | 11/2015 | Rathod et al. | |
| 2001/0008147 | A1 | 7/2001 | Miller et al. | |
| 2004/0154668 | A1 * | 8/2004 | Larsen | F16K 1/305 137/505.25 |
| 2005/0109403 | A1 * | 5/2005 | Gotthelf | G05D 16/0669 137/505.34 |
| 2005/0241623 | A1 * | 11/2005 | Ricco | F02M 21/0239 123/527 |
| 2007/0125050 | A1 * | 6/2007 | Nakajima | B01D 46/2411 55/418 |
| 2015/0007540 | A1 | 6/2015 | Sarai et al. | |

FOREIGN PATENT DOCUMENTS

| | | |
|---|---|---|
| CN | 104204496 A | 12/2014 |
| EP | 1715400 A1 | 10/2006 |
| WO | 96/07129 | 3/1996 |
| WO | 9607129 A1 | 3/1996 |
| WO | 2012085949 A1 | 6/2012 |

OTHER PUBLICATIONS

International Preliminary Report on Patentability for corresponding International Application No. PCT/US2016/028392 dated Apr. 7, 2017.

\* cited by examiner

INTEGRATED NATURAL GAS FLOW REGULATION SYSTEM INCLUDING FUEL TEMPERATURE HOMOGENIZATION FOR IMPROVED ENGINE PERFORMANCE AND REDUCED EMISSIONS

Related Applications

This application is a national phase of International Patent Application Serial No. PCT/US2016/028392, filed on Apr. 20, 2016 which claims the benefit of U.S. Provisional Patent Application No. 62/149,889 filed Apr. 20, 2015 which is hereby incorporated herein by reference.

FIELD OF INVENTION

The present invention relates to the integration of multiple components into a system for fuel pressure regulation and conditioning of natural gas (NG) temperature for improved engine performance and reduced emissions in a natural gas fueled internal combustion engine.

BACKGROUND

Natural gas (NG), as a fuel for natural gas vehicles (NGVs), can be stored on-vehicle in a liquefied state (LNG) or compressed gaseous state (CNG). To be compatible with fuel conveyance, injection and combustion, the NG must be conditioned from the state of storage (high density) to a gaseous state of reduced pressure, sufficiently high temperature and non-destructive level of cleanliness. Conditioning may include vaporization, filtration, pressure reduction and heating.

Currently, NGV systems include a series of non-integrated fuel conditioning equipment, joined by fittings and hoses. This approach has led to an industry practice of using complex, large envelope, NGV fuel systems that contain a large number of leak points.

Fuel heating usually occurs only in the pressure regulator body, with an emphasis on fuel heating downstream of the point of pressure regulation. While this method of fuel temperature conditioning may resolve concerns over the constraints of low temperature operating limits of downstream equipment, this indiscriminant method of heating fails to limit the range of fuel density provided to the engine.

In a typical NGV, NG is supplied to the injectors at a specific, relatively steady, pressure. The current market defines a good fuel management system as one that provides NG at minimum deviation from the anticipated preset pressure. This approach acts to reduce the effect of one of two critical contributors to fuel density. Pressure is measured at the fuel rail and this value, along with fuel demand, determines the duration that each injector opens. The other contributor to fuel density, temperature, is accounted for, but is limited by the accuracy of engine calibration and, under transient fuel demands of the engine, the response time of fuel rail temperature sensors. Therefore, imperfections in engine calibration, along with the non-instantaneous nature of temperature sensing, contribute to intermittent episodes of non-ideal fuel/air ratios, leading to loss of power, poor drivability, and incomplete combustion (increased emissions).

SUMMARY OF INVENTION

The present invention provides an NGV fuel management system that integrates, into a single system, some or all of the functions of filtration (high and low pressure), heating, flow shut-off, pressure regulation, pressure sensing, temperature sensing and protection of fuel rail from over-pressurization. In addition, the system is designed such that the temperature of the natural gas leaving the module is actively controlled within a tighter range enabling optimization of engine calibration for improved performance and reduced emissions.

An integrated fuel management system according to the invention is characterized by one or more of the following features:

- integrated NGV fuel management system characterized by a manifold block to which the other components are directly mounted;
- fuel temperature management and harmonization for improved engine performance;
- high pressure coalescing filter heated with radiator fluid;
- heated fuel management module;
- high pressure pre-heating of NG within module;
- low pressure post heating of NG with close coupled module;
- natural gas and radiator fluid flow paths within the system designed so that the critical components such as static and dynamic seals, within the system operate in an optimal temperature environment for improved performance and durability of the device; and/or
- engine jacket fluid flow path within the system is such that the fluid is isolated from the natural gas without the use of seals, fasteners, joints, connections or any such permeable boundary.

The present invention provides an NGV fuel management system that integrates into a single system some, or all, of the following functions.

Filtration: The module may include a high pressure coalescing filter immediately downstream of the inlet connection and may include a low pressure coalescing filter immediately downstream on the pressure reducing regulator.

Heating: The module may include a specifically designed flow path for engine coolant fluid. Hot engine coolant fluid arrives to the module from the engine jacket and provides an energy source which increases the temperature of the module and, therefore, of the natural gas flowing through the module as well as the internal seals within the module thus protecting the seals against the negative effects of low temperature. The radiator fluid flow path includes an inlet and outlet connection as well as a configurable passageway which can provide an optimized surface area for energy transfer between the engine coolant fluid and aluminum (or stainless steel) manifold body of the manifold. The engine coolant fluid path preferably is isolated from the NG fluid path along the full extent thereof within the module by the internal walls of the module which eliminates the need for seals between the engine coolant fluid and natural gas and eliminates the potential for cross contamination of the two fluids.

Flow shut off: The module may include a solenoid which may operate on 12 or 24V. This solenoid valve preferably is provided directly upstream of the pressure regulator in the high pressure boundary.

Pressure regulation: The module may include a single stage piston regulator.

Pressure sensing: The module may include pressure sensors upstream and/or downstream of the pressure regulator.

Temperature sensing: The module may include provisions for a temperature sensor upstream and/or downstream of the pressure regulator.

Protection from fuel rail over-pressurization: The module may include a pressure relief valve (PRV) or equivalent downstream of the pressure regulator ensuring that the low pressure boundary is not over-pressurized.

The integration of a filter into the unit, with the filter housing being thermally conductive with the heated manifold housing for heating the incoming gas over a longer path than anything done before. Also, the heat exchange fluid is isolated from the gas by a solid wall and without the use of seals.

Accordingly, the invention provides a fluid pressure regulation and conditioning module comprising a metal manifold including an fluid inlet, fluid outlet and a fluid flow path between the fluid inlet and fluid outlet, and the metal manifold further including, for heating of the metal manifold with an externally supplied heat exchange media, a heat exchange media inlet, heat exchange media outlet and a heat exchange media flow path between the heat exchange media inlet and heat exchange media outlet; a pressure regulator assembled to the metal manifold and disposed along the fluid flow path for regulating the pressure of the fluid exiting the module; and a filter assembly upstream of the pressure regulator, the filter assembly including a metal filter housing and a filter element contained within the metal filter housing, the metal filter housing being in direct thermal contact with the metal manifold whereby heat from the metal manifold can flow to the metal filter housing for heating of the fluid not only in the metal manifold but also within the metal filter housing.

According to another aspect of the invention, a fluid pressure regulation and conditioning module comprising a manifold including an fluid inlet, fluid outlet and a fluid flow path between the fluid inlet and fluid outlet, and the manifold further including, for heating fluid flowing along the fluid flow path with an externally supplied heat exchange media, a heat exchange media inlet, heat exchange media outlet and a heat exchange media flow path between the heat exchange media inlet and heat exchange media outlet; a pressure regulator assembled to the manifold and disposed along the fluid flow path for regulating the pressure of the fluid exiting the module; and a filter assembly upstream of the pressure regulator, the filter assembly including a filter housing and a filter element contained within the filter housing; and a flow control valve assembled to the manifold for controlling fluid flow from the filter assembly to the pressure regulator.

According to a further aspect of the invention, a natural gas vehicle comprises an internal combustion engine, a storage for liquefied or compressed natural gas, and a fluid pressure regulation and conditioning module, wherein the module regulates and conditions the liquefied or compressed natural gas received from the storage and prior to passage to the internal combustion engine.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

Figure 1:
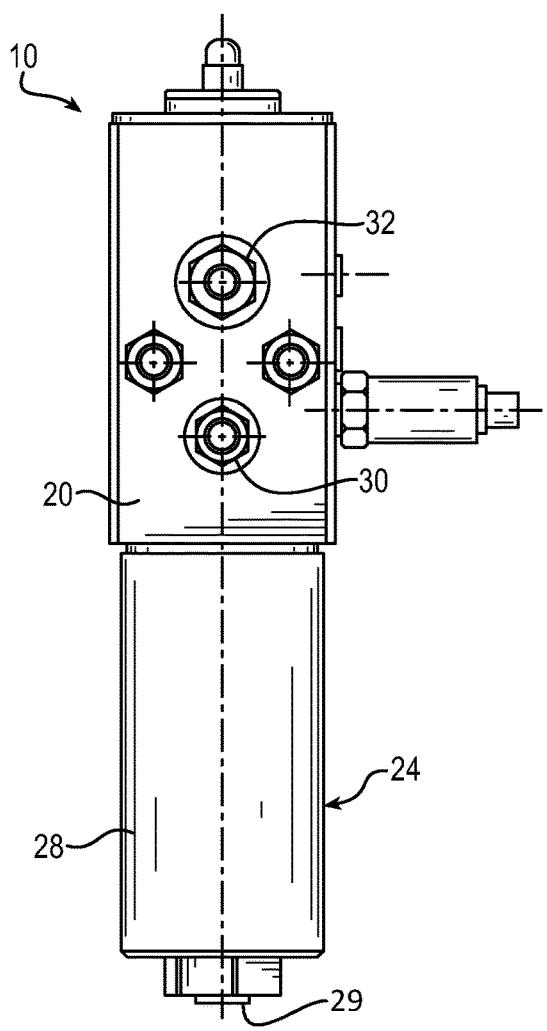
FIG. 1 is a front elevational view of an exemplary fuel management module according to the present invention.
Figure 2:
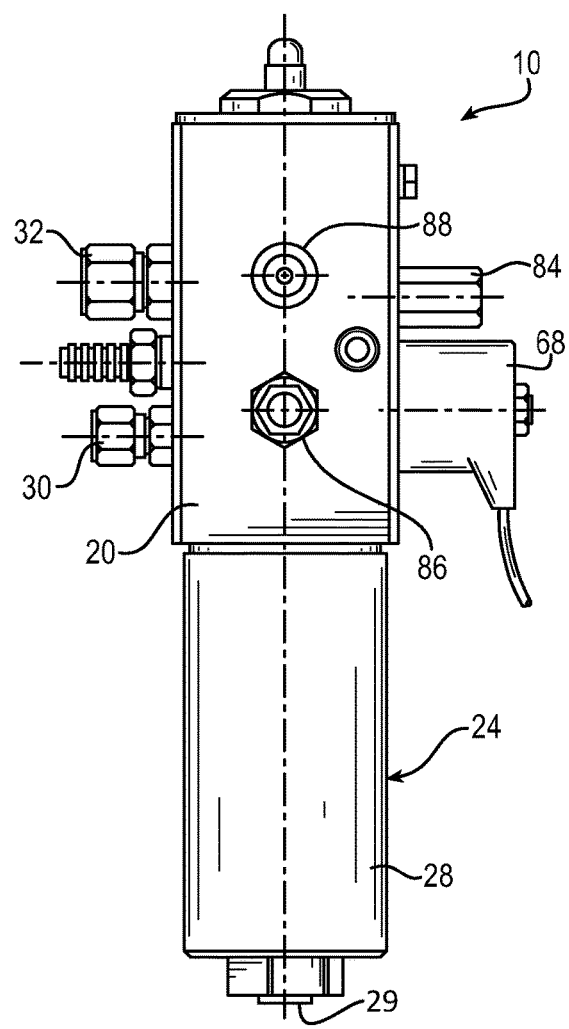
FIG. 2 is a side elevational view of the module.
Figure 3:
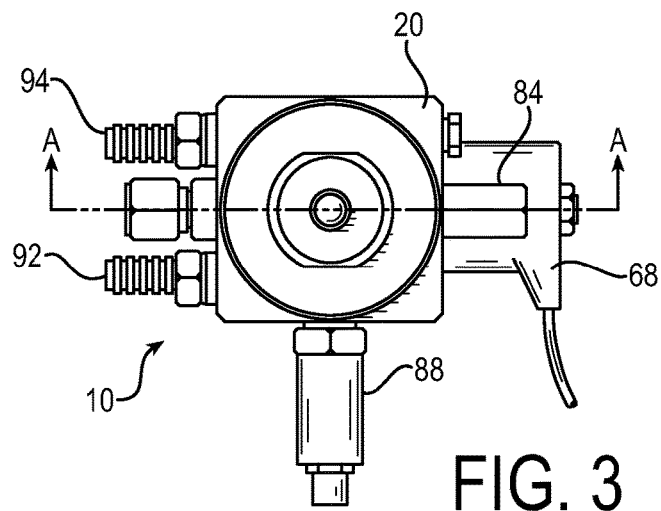
FIG. 3 is a top view of the module.

Referring now in detail to the drawings and initially to FIGS. 1-4, an exemplary fuel management module according to the present invention is indicated generally by reference numeral 10. The module is intended for use onboard a natural gas vehicle (NGV) (represented by the broken outline 12 in FIG. 4) for fuel pressure regulation and conditioning of natural gas (NG) temperature for improved engine performance and reduced emissions in the vehicle. Although the module 10 and associated system and method are herein described in relation to conditioning NG in a NGV, it will be appreciated by those skilled in the art that the module, system and method may have other applications, including use with fluids other than NG.

The module 10 is comprised of a manifold 20 (or more particularly a unitary manifold block) which houses components and subsystems used for the conditioning of NG fuel. The manifold 12 preferably is made of aluminum or another suitable material preferably having a thermal conductivity at 25 degrees C. of at least 15 W/(m K), such as for example stainless steel.

Integrated into the module 20 is a filter assembly 24 including a filter element 26 and a filter housing 28 (also referred to as a bowl) that is mounted to the manifold 12. The filter housing preferably is removably attached to the manifold so that the filter element can be replaced as needed. In the illustrated embodiment, the filter housing is threaded at its upper end for threading into a threaded bore at the underside of the manifold.

For reasons discussed in greater detail below, the filter housing 28 preferably is made of aluminum or other suitable material preferably having a thermal conductivity at 25 degrees C. of at least 15 W/(m K), such as for example stainless steel. In addition, the filter housing is in thermally conductive relationship with the manifold such that heat can flow from the manifold to the filter housing for thermal conditioning of the high pressure natural gas as well as providing high pressure filtration.

The filter element 26 may be a coalescing filter element. In the illustrated embodiment, flow of the NG is from the inside to the outside of the filter element. Any water contained in the NG will coalesce and flow to the bottom of the filter housing 28. The filter housing may be equipped with a bottom plug 29 that may be removed to drain captured water from the filter housing.

Figure 4:
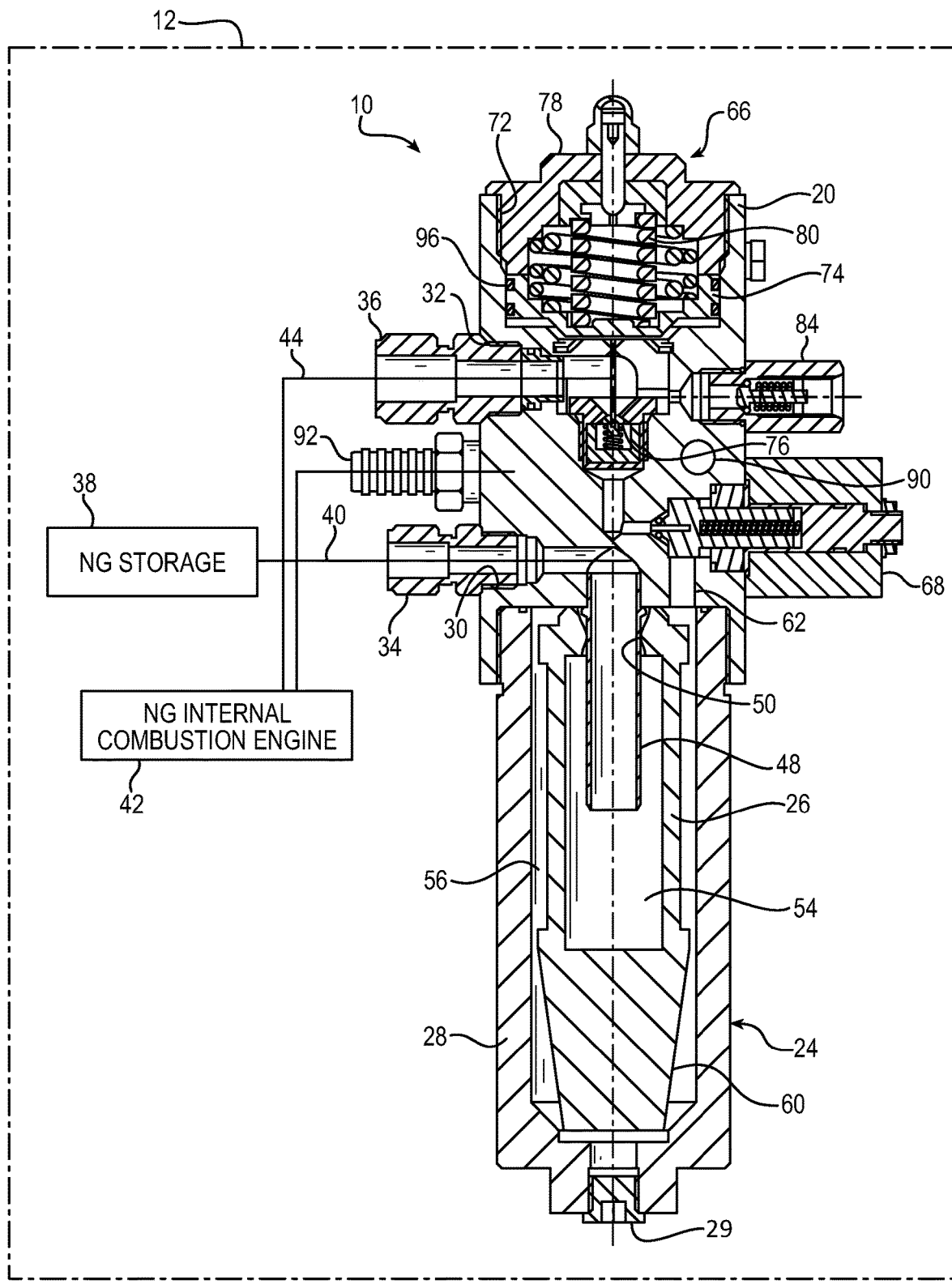
FIG. 4 is a cross-sectional view of the module, taken along the line A-A of FIG. 3.

With particular reference to FIG. 4, the manifold 20 has an inlet port 30 and an outlet port 32 for the natural gas. The inlet and outlet ports may have fittings 34 and 36 threaded therein to provide for convenient connection to gas flow lines. The inlet port normally would be connected to a supply of/storage 38 for of liquefied or compressed natural gas, as by line 40, while the outlet port would be connected to a natural gas internal combustion engine 42, as by line 44.

The inlet port 30 communicates with a center tube 48 that extends into the interior of the filter element 26 such that the natural gas entering the filter element will be introduced about midway along the length of the tubular filter media portion of the filter element. The center tube may be threaded into a bottom bore in the manifold 20 or otherwise secured to the manifold.

The filter element 26 has at its upper end an annular seal 50 that seals to the outer diameter of the center tube 48. The seal isolates the interior 54 of the filter element from an annular region 56 formed between the exterior of the filter element and the radially outwardly spaced wall of the filter housing 28 that surrounds the filter element.

The lower end of the filter element 26 has a bottom closure member 60 of frusto-conical shape that abuts a bottom wall of the filter housing 28. The upper end of the frusto-conical closure member defines a narrow annular passage for water to flow from an upper region of the filter housing to the lower region of the filter housing while minimizing splashing of water in the lower region into the annular region 56 that might otherwise occur when the natural gas vehicle goes over bumps.

The annular region 56 communicates with a passage 62 in the manifold 20 that opens to the bottom of the manifold. NG will flow from the filter assembly 24 to a pressure regulator assembly 66 that may be of conventional type. The rate of flow to the pressure regulator may be controlled by a flow control valve 68 and in particular a solenoid operated valve that may be connected to a suitable controller in the vehicle. Flow exiting the pressure regulator passes to the outlet port 32 that will be connected to the NG internal combustion engine 42.

In some applications, the flow control valve 68 may function simply as a shut-off valve for shutting off flow of NG to the internal combustion engine. The flow control valve preferably is a cartridge valve threaded into manifold.

The pressure regulator assembly 66, on the other hand, may be assembled directly into a bore 72 opening to the top of the manifold 20. In particular, the pressure regulator assembly may include a piston 74 that is guided for axial movement in the bore 72 of the manifold, which piston operates the metering valve 76 of the pressure regulator. The outer (upper) end of the bore may be closed by a cover 78, and the regulator springs 80 may be interposed between the cover and the piston as illustrated.

In addition, the module 10 may have integrated therein a pressure relief valve 84, which preferably is a cartridge relief valve threaded into a threaded bore in the manifold that communicates with the gas flow passage through the manifold. The pressure relief valve can protect the engine's fuel rail from over-pressurization.

In addition, various sensors may be integrated into the module 10, including pressure and temperature sensors for providing feedback to a controller that controls the NG delivery system. In particular, a cartridge pressure sensor 86 is threaded into the manifold for sensing the pressure in the line between the flow control valve and the pressure regulator. A further plug sensor 88 may be provided for sensing the reduced pressure downstream of the pressure regulator valve 76.

Further in accordance with the invention, the module 10 is provided with an integrated heating system for controlling the low temperature of the natural gas. The heating system includes a heat exchange fluid (also herein referred to as a heat exchange media) flow path 90 in the manifold that extends between an inlet port 92 and an outlet port 94. The heat exchange media flow path may be configured to provide the desired amount of surface area between the heat exchange media and the manifold for effective heating of the manifold.

It is noted that heat exchange media passage(s) forming the flow path 90 are isolated by internal metal walls of the manifold 20 from the natural gas flow passages media through the manifold thereby preventing any contamination of the heat exchange fluid with natural gas on the one hand and any contamination of the nature gas with the heat exchange fluid on the other hand. This is effected without the need for any seals.

The heat exchange pathway 90 in the manifold can accept engine coolant fluid from the water jacket of the engine 42. The jacket water, or engine coolant, provides an energy source at a relatively constant temperature (controlled by the engine thermostat). This energy source is used to establish and maintain a high temperature for the manifold. This energy is conducted through the metal manifold 20 and passed on to the balance of the module as well as the natural gas in contact with the manifold. As above mentioned, the radiator fluid flow path is isolated from the NG track by the internal walls of the module and is designed such that the fluid is isolated from the natural gas without the use of seals, fasteners, joints, connections or any such permeable boundary.

In addition, the heat conducted within the system is also made available to the particular areas of the internal seals, such as piston seals 96, within the module, enabling the seals to provide the function of sealing and protect against the negative effects of low temperature (degradation of sealing performance—reliability and durability).

Of particular significance is that the integration of filter assembly 24 into the module 10 enables the heat transfer to occur directly from the heated manifold block 20 to the filter housing 28.

In operation, compressed or liquefied natural gas is supplied to the inlet 30 of the module 10 from on-board fuel storage infrastructure 38. At this point in the fuel system the temperature of the natural gas approximates ambient temperature (for CNG systems), or the boiling point of NG (for LNG systems).

The filter assembly 24 being an integral part of the regulator system enables heat transfer to occur from the heated manifold 20 to the filter housing 28. Energy in the form of heat is transferred from the manifold to the filter housing through the threaded connection that joins these two components. This energy is then transferred to the NG at a high rate due to the large internal surface area of the filter bowl. The result is an impactful increase in temperature that establishes several design advantages:

1. Substantial heating of the NG by a controlled temperature heat source, prior to the point of pressure regulation, acts to raise the temperature of the NG near the temperature of said heat source (the engine jacket water), with minimized variance, despite environmental temperatures.
2. The potential for ice formation at the solenoid valve and seat assembly filter is reduced.
3. The module has an increased level of heat transfer to the gas without an additional heat source such as an electrical heater.
4. Freezing of any moisture present in the gas within the filter element is reduced if not eliminated.
5. Ice particle formation and travel downstream to the engine gas injectors is reduced if not eliminated.

Figure 5:
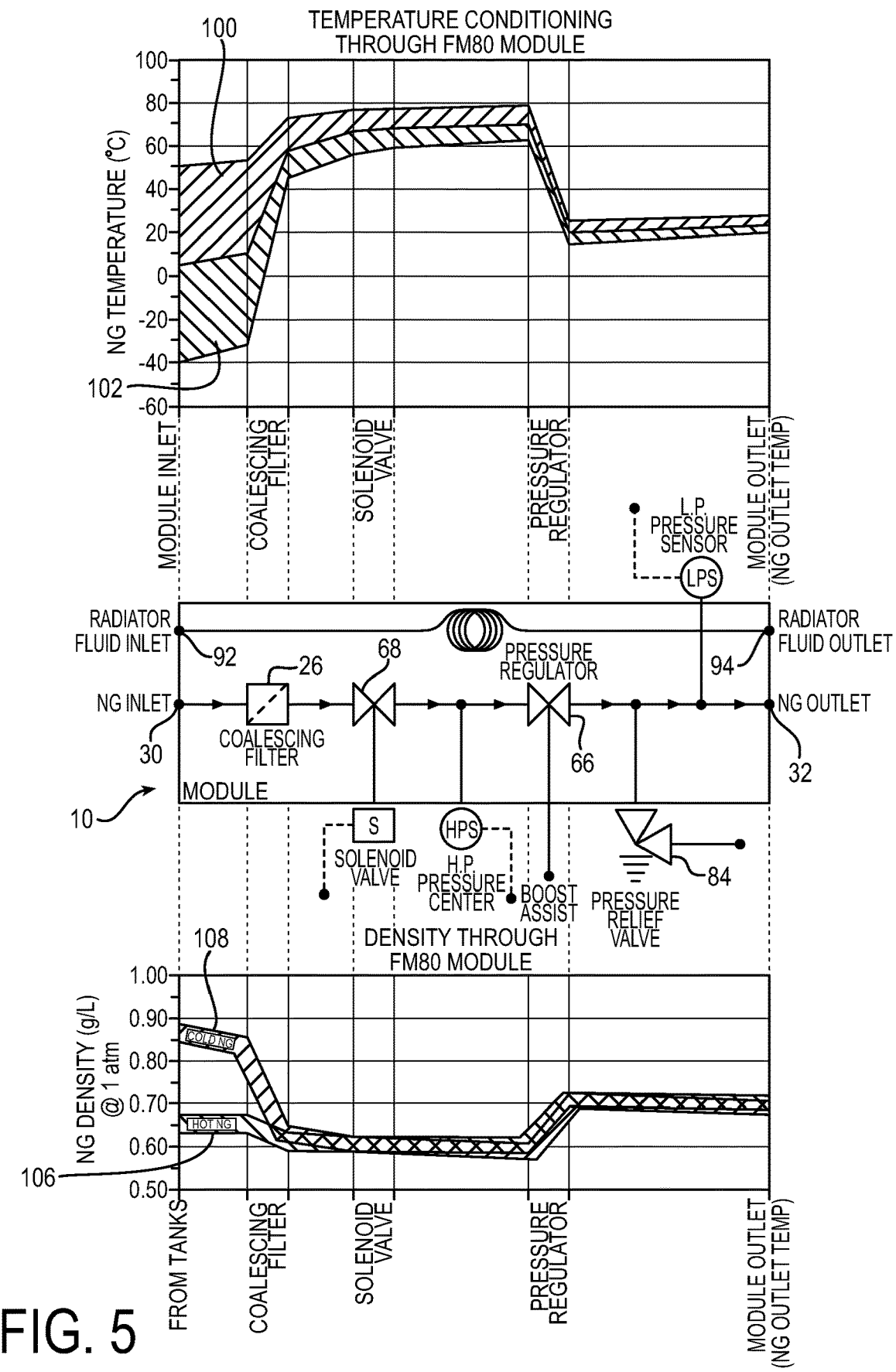
FIG. 5 is a schematic illustration of the module correlated with graphs showing the effect of the module on fuel temperature homogenization.

Referring now to FIG. 5, the effect of the on-board fuel management module on fuel temperature homogenization is illustrated. At the left in the upper temperature graph, the upper band 100 represents the anticipated temperature range of incoming compressed gas whereas the lower band 102 represents the anticipated temperature range of incoming liquefied gas. As shown, the bands substantially narrow as the NG flows through the heated filter assembly and then the heated manifold, such that the temperature of the lower pressure NG leaving the module is in a substantially narrower range at the right of the graph.

Likewise, at the left in the lower density graph, the lower band 106 represents the anticipated density range of incoming compressed gas whereas the upper band 108 represents the anticipated density range of incoming liquefied gas. As shown, the bands converge as the NG flows through the heated filter assembly such that the density of the lower pressure NG leaving the module at the right in the graph is essentially the same regardless of whether the module receives higher temperature compressed gas or lower temperature liquefied gas.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. A fluid pressure regulation and conditioning module comprising:
    a metal manifold including an fluid inlet, fluid outlet and a fluid flow path between the fluid inlet and fluid outlet, and the metal manifold further including, for heating of the metal manifold with an externally supplied heat exchange media, a heat exchange media inlet, heat exchange media outlet and a heat exchange media flow path between the heat exchange media inlet and heat exchange media outlet;
    a pressure regulator assembled to the metal manifold and disposed along the fluid flow path for regulating the pressure of the fluid exiting the module; and
    a filter assembly upstream of the pressure regulator, the filter assembly including a metal filter housing and a filter element contained within the metal filter housing, the metal filter housing being in direct thermal contact with the metal manifold whereby heat from the metal manifold can flow to the metal filter housing for heating of the fluid not only in the metal manifold but also in the metal filter housing;
    wherein the filter element includes a tubular filter media portion and the fluid inlet of the manifold communicates with a center tube that extends from the fluid inlet from an upper open end of the filter element into the interior of the filter element without crossing the tubular filter media portion of the filter element.

2. The fluid pressure regulation and conditioning module of claim 1, wherein the fluid flow path and the heat exchange media flow path are separated from each other along their entire respective lengths by internal metal walls of the metal manifold.

3. The fluid pressure regulation and conditioning module of claim 1, wherein the metal filter housing has a threaded end portion for threaded engagement with a correspondingly threaded portion of the manifold.

4. The fluid pressure regulation and conditioning module according to claim 1, wherein the pressure regulator is assembled in a bore in the manifold that is closed by a removable cover.

5. The fluid pressure regulation and conditioning module according to claim 1, further comprising a fluid flow control valve interposed between the filter assembly and the pressure regulator.

6. The fluid pressure regulation and conditioning module of claim 5, wherein the fluid flow control valve is a solenoid cartridge valve threaded into the metal manifold.

7. The fluid pressure regulation and conditioning module according to claim 1, wherein the metal manifold and metal filter housing are made of aluminum or stainless steel.

8. The fluid pressure regulation and conditioning module according to claim 1, wherein the manifold is a unitary block of metal.

9. A natural gas vehicle comprising an internal combustion engine, a storage for liquefied or compressed natural gas, and a fluid pressure regulation and conditioning module according to claim 1, wherein the module regulates and conditions the liquefied or compressed natural gas received from the storage and prior to passage to the internal combustion engine.

10. The fluid pressure regulation and conditioning module of claim 1, wherein the filter assembly is a high pressure filter assembly and wherein the filter element is a high pressure coalescing filter element.

11. A fluid pressure regulation and conditioning module comprising:
    a metal manifold including an fluid inlet, fluid outlet and a fluid flow path between the fluid inlet and fluid outlet; and
    a pressure regulator assembled to the metal manifold and disposed along the fluid flow path for regulating the pressure of the fluid exiting the module; and
    wherein the metal manifold further includes, for heating of the metal manifold with an externally supplied heat exchange media, a heat exchange media inlet, heat exchange media outlet and a heat exchange media flow path between the heat exchange media inlet and heat exchange media outlet, and
    wherein the fluid flow path and the heat exchange media flow path are separated from each other along their entire respective lengths by internal metal walls of the metal manifold without the use of seals, fasteners, joints, or connections.

12. The fluid pressure regulation and conditioning module according to claim 8, wherein the pressure regulator is assembled in a bore in the metal manifold that is closed by a removable cover.

13. The fluid pressure regulation and conditioning module according to claim 11, further comprising a fluid flow control valve for controlling the rate of fluid flow to the pressure regulator.

14. The fluid pressure regulation and conditioning module of claim 13, wherein the fluid flow control valve is a solenoid cartridge valve threaded into the manifold.

15. The fluid pressure regulation and conditioning module according claim 11, wherein the metal manifold and metal filter housing are made of aluminum or stainless steel.

16. A fluid pressure regulation and conditioning module comprising:
- a manifold including an fluid inlet, fluid outlet and a fluid flow path between the fluid inlet and fluid outlet, and the manifold further including, for heating fluid flowing along the fluid flow path with an externally supplied heat exchange media, a heat exchange media inlet, heat exchange media outlet and a heat exchange media flow path between the heat exchange media inlet and heat exchange media outlet;
- a pressure regulator assembled to the manifold and disposed along the fluid flow path for regulating the pressure of the fluid exiting the module; and
- a filter assembly upstream of the pressure regulator, the filter assembly including a filter housing and a filter element contained within the filter housing; and
- a flow control valve assembled to the manifold for controlling fluid flow from the filter assembly to the pressure regulator, wherein the flow control valve is downstream of the filter assembly and upstream of the pressure regulator, wherein the flow control valve is shut-off valve for shutting off flow;
- wherein the filter assembly is a high pressure filter assembly and wherein the filter element is a high pressure coalescing filter element.

17. The fluid pressure regulation and conditioning module according to claim 16, wherein the pressure regulator is assembled in a bore in the manifold that is closed by a removable cover.

18. The fluid pressure regulation and conditioning module according to claim 16, wherein the fluid flow control valve is a solenoid cartridge valve threaded into the manifold.

19. The fluid pressure regulation and conditioning module according to claim 16, wherein at least one sensor is threaded into a bore in the manifold.

20. The fluid pressure regulation and conditioning module of claim 13, wherein the filter element includes a tubular filter media portion and the fluid inlet of the manifold communicates with a center tube that extends from the fluid inlet from an upper open end of the filter element into the interior of the filter element without crossing the tubular filter media portion of the filter element.

* * * * *